(12) United States Patent
Julian et al.

(10) Patent No.: US 10,460,600 B2
(45) Date of Patent: Oct. 29, 2019

(54) DRIVER BEHAVIOR MONITORING

(71) Applicant: NETRADYNE, INC., San Diego, CA (US)

(72) Inventors: David Jonathan Julian, San Diego, CA (US); Avneesh Agrawal, Bengaluru (IN)

(73) Assignee: NETRADYNE, INC., San Diego, CA (US)

( * ) Notice: Subject to any disclaimer, the term of this patent is extended or adjusted under 35 U.S.C. 154(b) by 0 days.

(21) Appl. No.: 15/437,646

(22) Filed: Feb. 21, 2017

(65) Prior Publication Data

US 2017/0200061 A1 Jul. 13, 2017

Related U.S. Application Data

(63) Continuation of application No. PCT/US2017/013062, filed on Jan. 11, 2017.

(Continued)

(51) Int. Cl.
| | |
|---|---|
| *G06K 9/62* | (2006.01) |
| *B60W 40/09* | (2012.01) |
| *G06K 9/00* | (2006.01) |
| *G06T 11/60* | (2006.01) |
| *G06T 7/90* | (2017.01) |
| *G07C 5/02* | (2006.01) |
| *G08G 1/04* | (2006.01) |
| *G08G 1/01* | (2006.01) |
| *G07C 5/08* | (2006.01) |

(52) U.S. Cl.
CPC ........... *G08G 1/04* (2013.01); *G06K 9/00791* (2013.01); *G06K 9/00845* (2013.01); *G06K 9/6271* (2013.01); *G07C 5/0808* (2013.01); *G07C 5/0866* (2013.01); *G08G 1/0112* (2013.01); *G08G 1/0133* (2013.01); *B60W 40/09* (2013.01); *B60W 2420/42* (2013.01)

(58) Field of Classification Search
CPC ...... G07C 5/008; G07C 5/0808; G07C 5/085; G07C 5/0841; G07C 5/0816; G07C 5/00; G07C 5/02; G07C 5/0858; G07C 5/0866; G07C 5/004; G07C 5/006; G07C 5/04; G07C 5/0825; H04W 4/046; H04W 4/008; H04W 4/001; H04W 4/12; H04W 4/22; H04W 84/12; H04W 12/08
See application file for complete search history.

(56) References Cited

U.S. PATENT DOCUMENTS

| | | |
|---|---|---|
| 5,808,728 A | 9/1998 | Uehara |
| 6,768,944 B2 | 7/2004 | Breed et al. |

(Continued)

OTHER PUBLICATIONS

International Search Report & Written Opinion dated Mar. 23, 2017 for International Application No. PCT/US2017/023781.

(Continued)

*Primary Examiner* — Dave Czekaj
*Assistant Examiner* — Kehinde Abimbola
(74) *Attorney, Agent, or Firm* — Greenberg Traurig, LLP

(57) ABSTRACT

Systems and methods provide, implement, and use using a computer-vision based methods of context-sensitive monitoring and characterization of driver behavior. Additional systems and methods are provided for unsupervised learning of action values, monitoring of a driver's environment, and transmitting visual information from a client to a server.

26 Claims, 3 Drawing Sheets

Related U.S. Application Data

(60) Provisional application No. 62/277,470, filed on Jan. 11, 2016.

(56) References Cited

U.S. PATENT DOCUMENTS

| | | | |
|---|---|---|---|
| 7,113,867 B1 | 9/2006 | Stein | |
| 7,254,482 B2 | 8/2007 | Kawasaki et al. | |
| 7,957,559 B2 | 6/2011 | Shima et al. | |
| 8,031,062 B2 | 10/2011 | Smith | |
| 8,134,596 B2* | 3/2012 | Lei | G06K 9/00369 348/169 |
| 8,446,781 B1 | 5/2013 | Rajan et al. | |
| 8,676,492 B2 | 3/2014 | Litkouhi et al. | |
| 8,954,226 B1* | 2/2015 | Binion | G06Q 40/08 701/33.4 |
| 9,111,453 B1* | 8/2015 | Alselimi | G06K 9/00785 |
| 9,147,219 B2* | 9/2015 | Binion | B60W 40/10 |
| 9,147,352 B1 | 9/2015 | Cotrone | |
| 9,147,353 B1 | 9/2015 | Slusar | |
| 9,262,787 B2* | 2/2016 | Binion | G07C 5/008 |
| 9,275,417 B2* | 3/2016 | Binion | B60W 40/10 |
| 9,361,650 B2* | 6/2016 | Binion | B60W 40/10 |
| 9,477,990 B1* | 10/2016 | Binion | B60W 40/10 |
| 9,501,935 B2* | 11/2016 | Kastner | B60W 30/09 |
| 9,594,371 B1 | 3/2017 | Palmer et al. | |
| 9,626,867 B2* | 4/2017 | Trombley | G01S 5/0072 |
| 9,892,567 B2* | 2/2018 | Binion | G06Q 40/08 |
| 9,959,764 B1* | 5/2018 | Binion | G07C 5/085 |
| 10,176,524 B1* | 1/2019 | Brandmaier | G06Q 40/08 |
| 2007/0193811 A1 | 8/2007 | Breed et al. | |
| 2008/0111666 A1 | 5/2008 | Plante | |
| 2009/0140887 A1 | 6/2009 | Breed et al. | |
| 2009/0265069 A1 | 10/2009 | Desbrunes | |
| 2009/0284361 A1* | 11/2009 | Boddie | B60Q 9/008 340/439 |
| 2009/0299857 A1* | 12/2009 | Brubaker | G06Q 30/02 705/14.66 |
| 2009/0319113 A1 | 12/2009 | Lee | |
| 2010/0017115 A1 | 1/2010 | Gautama | |
| 2010/0045799 A1* | 2/2010 | Lei | G06K 9/00369 348/169 |
| 2010/0052883 A1* | 3/2010 | Person | B60Q 1/38 340/435 |
| 2010/0104199 A1 | 4/2010 | Zhang et al. | |
| 2010/0198494 A1 | 8/2010 | Chao | |
| 2010/0238262 A1* | 9/2010 | Kurtz | H04N 7/142 348/14.01 |
| 2010/0245532 A1* | 9/2010 | Kurtz | G06K 9/00711 348/14.03 |
| 2011/0170744 A1 | 7/2011 | Malinovskiy | |
| 2012/0033896 A1* | 2/2012 | Barrows | G06T 7/223 382/295 |
| 2012/0062743 A1 | 3/2012 | Lynam et al. | |
| 2012/0194357 A1 | 8/2012 | Ciolli | |
| 2013/0332004 A1 | 12/2013 | Gompert et al. | |
| 2014/0025285 A1* | 1/2014 | Trombley | G01S 5/0072 701/301 |
| 2014/0028878 A1 | 1/2014 | S. V. et al. | |
| 2014/0065485 A1 | 3/2014 | Shinya et al. | |
| 2014/0098060 A1 | 4/2014 | McQuade et al. | |
| 2014/0136046 A1 | 5/2014 | Smith et al. | |
| 2014/0236414 A1* | 8/2014 | Droz | G08G 1/161 701/28 |
| 2015/0025784 A1* | 1/2015 | Kastner | B60W 30/09 701/119 |
| 2015/0049193 A1 | 2/2015 | Gupta et al. | |
| 2015/0112504 A1* | 4/2015 | Binion | G06Q 40/08 701/1 |
| 2015/0112543 A1* | 4/2015 | Binion | B60W 40/10 701/32.2 |
| 2015/0112545 A1* | 4/2015 | Binion | B60W 40/10 701/33.4 |
| 2015/0112730 A1* | 4/2015 | Binion | G06Q 40/08 705/4 |
| 2015/0112731 A1* | 4/2015 | Binion | G06Q 40/08 705/4 |
| 2015/0112800 A1* | 4/2015 | Binion | G06Q 30/0255 705/14.53 |
| 2015/0168174 A1* | 6/2015 | Abramson | G01C 21/3697 701/408 |
| 2015/0175168 A1 | 6/2015 | Hoye et al. | |
| 2015/0178578 A1 | 6/2015 | Hampiholi | |
| 2015/0178998 A1* | 6/2015 | Attard | G07C 5/008 701/23 |
| 2015/0183372 A1 | 7/2015 | Lambert et al. | |
| 2015/0193855 A1 | 7/2015 | Costelloe | |
| 2015/0193885 A1* | 7/2015 | Akiva | G06Q 40/08 705/4 |
| 2015/0241231 A1* | 8/2015 | Abramson | G01C 21/3697 701/534 |
| 2015/0248836 A1* | 9/2015 | Alselimi | G06K 9/00785 348/149 |
| 2015/0254781 A1* | 9/2015 | Binion | B60W 40/10 701/32.2 |
| 2015/0281305 A1 | 10/2015 | Sievert et al. | |
| 2015/0329045 A1* | 11/2015 | Harris | G06K 9/00805 348/148 |
| 2015/0332590 A1 | 11/2015 | Salomonsson et al. | |
| 2015/0355336 A1 | 12/2015 | Krulwich | |
| 2016/0140614 A1* | 5/2016 | Brubaker | G06Q 30/02 705/14.46 |
| 2016/0150070 A1* | 5/2016 | Goren | H04W 48/04 455/404.2 |
| 2016/0343254 A1* | 11/2016 | Rovik | B60Q 9/00 |
| 2016/0357188 A1* | 12/2016 | Ansari | G05D 1/0212 |
| 2016/0357262 A1* | 12/2016 | Ansari | G06F 3/017 |
| 2016/0358477 A1* | 12/2016 | Ansari | G08G 1/167 |
| 2017/0279957 A1* | 9/2017 | Abramson et al. | H04M 1/72577 |
| 2018/0120859 A1* | 5/2018 | Eagelberg | G05D 1/0088 |

OTHER PUBLICATIONS

International Search Report & Written Opinion dated Oct. 17, 2017 for International Application No. PCT/US2017/044755.

International Search Report & Written Opinion dated Oct. 3, 2017 for International Application No. PCT/US2017/045932.

International Search Report & Written Opinion dated Mar. 30, 2017 in Int'l PCT Patent Serial No. PCT/US17/13062.

European Patent Office, Extended Search Reported dated Jul. 1, 2019, re Application No. 17837484.9-1207 / PCT/US2017044755, 10 pgs.

* cited by examiner

DRIVER BEHAVIOR MONITORING

CROSS-REFERENCE TO RELATED APPLICATION

This application is a continuation of PCT/US2017/013062, filed Jan. 11, 2017, which claims the benefit of U.S. Provisional Patent Application No. 62/277,470, filed on 11 Jan. 2016, and titled, "DRIVER BEHAVIOR MONITORING", the disclosures of which are expressly incorporated by reference in their entireties.

BACKGROUND

Field

Certain aspects of the present disclosure generally relate to internet-of-things (IOT) devices and applications, and more particularly, to devices, systems and methods for transmitting a descriptor of an event, as may be used, for example, in monitoring a behavior of drivers, in unsupervised learning of action values, and in monitoring an environment of a vehicle.

Background

Vehicles, such as automobiles, trucks, tractors, motorcycles, bicycles, airplanes, drones, ships, boats, submarines, and others, are typically operated and controlled by human drivers. Through training and with experience, a human driver may learn how to drive a vehicle safely and efficiently in a range of conditions or contexts. For example, as an automobile driver gains experience, he may become adept at driving in challenging conditions such as rain, snow, or darkness.

Drivers may sometimes drive unsafely or inefficiently. Unsafe driving behavior may endanger the driver and other drivers and may risk damaging the vehicle. Unsafe driving behaviors may also lead to fines. For example, highway patrol officers may issue a citation for speeding. Unsafe driving behavior may also lead to accidents, which may cause physical harm, and which may, in turn, lead to an increase in insurance rates for operating a vehicle. Inefficient driving, which may include hard accelerations, may increase the costs associated with operating a vehicle.

Driving behavior may be monitored. Driver monitoring may be done in real-time as the driver operates a vehicle, or may be done at a later time based on recorded data. Driver monitoring at a later time may be useful, for example, when investigating the cause of an accident. Driver monitoring in real-time may be useful to guard against unsafe driving, for example, by ensuring that a car cannot exceed a certain pre-determined speed.

While current driver monitoring devices may process inertial sensor data, speedometer data, GPS data, and the like, the use of visual data (such as camera data) in driver monitoring systems has been frustrated by technical problems or challenges related to transmitting and/or viewing large amounts of video. Vehicle monitoring devices present other technical hurdles in addition to challenges associated with video transmission and storage. As such, many of the potential benefits of vision-based monitoring have not yet been realized. Accordingly, certain aspects of the present disclosure are directed to enabling the use of visual data in IOT devices, by providing, for example, systems and methods for transmitting a descriptor of an event. Furthermore, certain aspects of the present disclosure may be directed to monitoring driving behavior.

SUMMARY

Certain aspects of the present disclosure generally relate to providing, implementing, and using a method of transmitting a descriptor of an event. Enabled with certain aspects of the present disclosure, monitoring systems may log data relating to a visual scene. In some embodiments, an enabled system may classify a driver behavior, such as by characterizing the behavior as "good" or "bad". In accordance with certain aspects of the present disclosure, monitoring and/or characterization of driver behaviors may be automated. Furthermore, certain aspects of the present disclosure may enable a context-sensitive classification of driver behavior. The present disclosure also provides systems and methods for unsupervised learning of action values, monitoring of a driver's environment, and transmitting visual data and/or descriptors of visual data from a client to a server.

Certain aspects of the present disclosure provide a method of transmitting a descriptor of an event. The method generally includes receiving visual data from a first camera at a first device; detecting the event based at least in part on the visual data and a first inference engine; determining the descriptor of the event; and transmitting a first data comprising the descriptor from the first device to a second device.

Certain aspects of the present disclosure provide an apparatus configured to transmit a descriptor of an event. The apparatus generally includes a first memory unit; a second memory unit; a first at least one processor coupled to the first memory unit; and a second at least one processor coupled to the first memory unit; in which the first at least one processor is configured to: receive visual data from a first camera; detect the event based at least in part on the visual data and a first inference engine; determine the descriptor of the event; and transmit a first data comprising the descriptor from the first device to the second memory unit.

Certain aspects of the present disclosure provide an apparatus configured to transmit a descriptor of an event. The apparatus generally includes means for receiving visual data from a first camera at a first device; means for detecting the event based at least in part on the visual data and a first inference engine; means for determining the descriptor of the event; and means for transmitting a first data comprising the descriptor from the first device to a second device Certain aspects of the present disclosure provide a non-transitory computer-readable medium having program code recorded thereon for transmitting a descriptor of an event. The program code is executed by a processor and generally comprises program code to: receive visual data from a first camera; detect an event based at least in part on the visual data and a first inference engine; determine the descriptor of the event; and transmit a first data comprising the descriptor to a second device.

Certain aspects of the present disclosure provide a method of monitoring a driver behavior. The method generally includes receiving visual data from a camera at a first device; wherein the camera is affixed to a first vehicle; and wherein the first device is connected to the camera; determining a classification of a driving behavior based at least in part on the visual data and an inference engine; and transmitting the classification to a second device.

Certain aspects of the present disclosure provide an apparatus configured to monitor a driver behavior. The apparatus generally includes a first memory unit; a second memory unit; a first at least one processor coupled to the first memory unit; and a second at least one processor coupled to the first memory unit; in which the first at least one processor is configured to: receive visual data from a camera at a first device; wherein the camera is affixed to a first vehicle; and wherein the first device is connected to the camera; determine a classification of a driving behavior based at least in part on the visual data and an inference engine; and transmit the classification to a second device.

Certain aspects of the present disclosure provide an apparatus for monitoring a driver behavior. The apparatus generally includes means for receiving visual data from a camera at a first device; wherein the camera is affixed to a first vehicle; and wherein the first device is connected to the camera; means for determining a classification of a driving behavior based at least in part on the visual data and an inference engine; and means for transmitting the classification to a second device.

Certain aspects of the present disclosure provide a non-transitory computer-readable medium having program code recorded thereon for monitoring a driver behavior. The program code is executed by a processor and generally comprises program code to: receive visual data from a camera at a first device; wherein the camera is affixed to a first vehicle; and wherein the first device is connected to the camera; determine a classification of a driving behavior based at least in part on the visual data and an inference engine; and transmit the classification to a second device.

DETAILED DESCRIPTION

Figure 1:
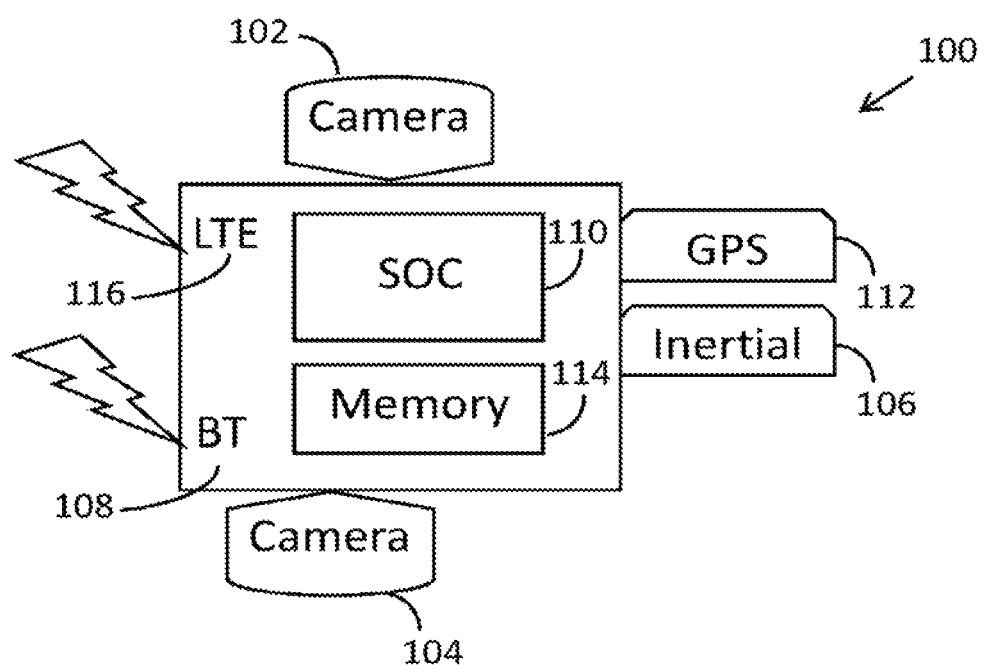
FIG. 1 illustrates an example of a device for transmitting a descriptor of an event in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Driver Monitoring Systems

Driver monitoring systems and devices may have multiple applications. Insurance companies may desire aggregated driver behavior data to influence premiums. Insurance companies may also seek to reward 'good' behavior and disincentivize 'bad' behavior as a way of reducing the number of loss events across a population of drivers. Fleet owners, likewise, might desire a system capable of classifying driver behaviors as a part of a program to incentivize their drivers to drive safely and efficiently. Likewise, taxi aggregators may desire a driver monitoring systems as part of a program to incentivize taxi driver behavior. Furthermore, taxi or ride-sharing aggregator customers may desire access to past characterizations of driver behavior so that they may filter and select drivers based on driver behavior criteria. For example, to ensure safety, drivers of children or other vulnerable populations might be screened based on driving behavior exhibited in the past. Parents may desire to monitor the driving patterns of their kids and may further utilize methods of monitoring and characterizing driver behavior to incentivize safe driving behavior.

In addition to human drivers, machine controllers are increasingly being used to drive vehicles. Self-driving cars, for example, may include a machine controller (which may be referred to as a computerized driving controller) that interprets sensory inputs and issues control signals to the car so that the car may be driven without a human driver or with minimal human intervention. As with human drivers, machine controllers may also exhibit unsafe or inefficient driving behaviors. Information relating to the driving behavior of a self-driving car may be of interest to engineers attempting to improve a self-driving car's controller, to law-makers considering policies relating to self-driving cars, and to other interested parties.

Currently available driver monitoring systems may be based on sensor data available in at an ODB-II port, which may not include vision data. For example, a driver monitoring system may rely on inertial and/or odometer data to monitor a driver. Such a driver monitoring system may be used to maintain a desired driving behavior and/or limit an undesired behavior, but may do so in a way that does not depend on the context of the driving behavior. In one example, a new driver may be limited to driving below a certain speed based on odometer measurements. Limiting the speed of a car for a new driver, however, may have unintended negative consequences. For example, if the driver is blocking an ambulance on a narrow road, the driver may be unable to overcome the speed settings and may block the ambulance.

Some driver monitoring systems may detect driving events based on non-visual sensors, but may further include a vision sensor to capture visual data around the time of a detected event. In one example, a driver monitoring system may process inertial sensor data to detect undesired driving behaviors. An inertial event may be an event with a detectable signature on a trace of accelerometer or gyrometer data, such a transient spike in an accelerometer trace corresponding to a sudden stop by a vehicle. As commercial-grade inertial sensors may be noisy, however, such a system may falsely detect irrelevant inertial events (which may be referred to as "false alarms") that have a similar accelerometer trace but that may not correspond to a driving event of interest. For example, running over a pothole or a speedbump may have an accelerometer reading that is similar to that of a small collision.

To mitigate against false alarms, an inertial sensor-based system may record a video clip upon detecting an inertial event, and then the video clip may be reviewed by a human operator at a later time. Due to the involvement of the human operator, such a system may be expensive and cumbersome. In addition, while the video clip may be useful to correct false alarms, an inertial-triggered driver monitoring system may fail to notice a driving event that does not have a reliably detectable inertial signature. For example, an inertial-based system with a camera may fail to detect a driver running through a red light if the driver neither accelerated or decelerated through the red light.

While a designer of an IOT device may desire continuous video recording and storage to provide greater coverage, practical considerations may frustrate the utility of such a system. For example, continuously recorded video may be burdensome to store, expensive and time-consuming to transmit over cellular or other wireless networks, and/or impractical to review by human operators.

Vision-Based Event Detection

Certain aspects of the present disclosure may enable the use of visual data in IOT systems and devices, such as driver behavior monitoring systems. Visual data may improve existing ways or enable new ways of monitoring and characterizing driver behavior. In some embodiments, visual data captured at a camera affixed to a vehicle may be used as the basis for detecting a driving event. For example, a driver monitoring system enabled in accordance with certain aspects of the present disclosure may detect that a driver has run a red light, even if the event could not be reliably detected from inertial sensor data and/or GPS data.

Several means for determining an event from visual data are contemplated. To determine that a driver has run a red light, for example, a first device may be configured to analyze visual data to detect an object. An object detection may refer to producing bounding boxes and object identifiers that correspond to one or more relevant objects in a scene. In a driver monitoring system, for example, it may be desirable to produce bounding boxes surrounding all or most of the visible cars, as well as visible traffic lights, traffic signs, and the like. Continuing with the example of running a red light, a first device may be configured to detect (locate and identify) a traffic light in visual data across multiple frames, including frames in which only a portion of a traffic light may be visible in the field of view of a camera. The event of running a red-light may then be based on a location of the detected traffic light and its state (such as green or red).

Several means for detecting an event based on visual data are contemplated. In some embodiments, bounding boxes for objects may be produced by a neural network that has been trained to detect and classify objects that are relevant to driving, such as traffic lights, traffic signs, and vehicles. In some embodiments, vehicles may be assigned to one or more of multiple classes, such as a car class and a truck class. If an image contains two cars and a traffic light, for example, a trained neural network may be used to analyze the image and produce a list of three sets of five numbers. Each set of numbers may correspond to one of the objects (one set for each of the two cars, and a third set for the traffic light). For each set, four of the five numbers may indicate the coordinates of the detected object (for example, the horizontal and vertical coordinates of a top-left corner of a bounding box surrounding the object, and a height and a width of the bounding box), and one number indicating the class to which it belonged (for example, the cars may be identified with a "1" and the traffic light may be identified with a "3").

In one example, a neural network may have been trained to detect objects based on a neural network architecture and/or training framework that has demonstrated a desired performance on an object detection benchmark, such as the PASCAL VOC 2012 dataset. PASCAL VOC refers to a Visual Object Classes challenge organized by the Pattern Analysis, Statistical modelling, and Computational Learning project of the European Union. In 2012, the challenge featured a training and validation dataset of 11,530 images containing 27,450 annotated objects from 20 classes. In this dataset, the annotations for objects were provided by human labelers, and included a bounding box and a class identifier for each object. The annotations may be considered similar to the exemplary neural network output format described above, in which a visual scene containing two cars and one traffic light may be represented with three sets of five numbers.

An aspect of the PASCAL VOC 2012 challenge invited participants to submit computer vision solutions (which may have been trained on the provided dataset) that could detect (locate and classify) objects in a separate test (evaluation) dataset. The performance of a neural network trained to perform object detection may be assessed in part, for example, by calculating an overlap between a bounding box output from a neural network (or other computer vision solution) and a bounding box provided as an annotation by a human labeler on the same image. Performance assessments could be used to compare different neural network architectures, for example. In addition, for a learning system such as a neural network, the assessments could be used as a training signal. Progress in automated methods of object detection have progressed rapidly in recent years. The availability of benchmarking datasets, such as the one featured in PASCAL VOC 2012, may have helped to drive progress in the field. For years after the PASCAL VOC 2012 competition ended, researchers continued to explore new training methods, neural network architectures, and the like, and continued to test their work and report performance on the PASCAL VOC 2012 dataset. For example, a Fast Region-based Convolutional Network (Fast R-CNN) method was introduced in 2015, which reported improvements on a measure of object detection performance on the PASCAL VOC 2012.

Returning to the present example of detecting that a vehicle ran a red light, a neural network model may be configured and trained to detect objects in a visual scene according to the Fast R-CNN method described above, or other competing methods that would be known to persons having ordinary skill in the art. For example, a neural network having an AlexNet or VGG16 architecture may be pre-trained on to perform object detection, using, for example, a PASCAL or ImageNet dataset. The network may then be further trained using a custom dataset relevant to driver monitoring, which may contain images from cameras that were affixed to cars, and which may contain annotated cars, trucks, traffic lights, traffic signs, and the like. In addition, or alternatively, the dataset may contain images that do not have human annotations, which may be used for unsupervised or semi-supervised training. In some embodiments, the neural network may be configured to produce bounding boxes and class identifiers.

Other output representations are also contemplated. For example, the output of a neural network may account for a calibration of a camera and may, instead of (or in addition to) representing a location of an object in coordinates of a visual field, represent the location of the objects as a distance from the camera (which may further include an angle and an indication of size). Likewise, objects may be identified as having a distance relative to a specified point that is not the camera, such as the front bumper of a car. Alternatively, or in addition, the class identification data may include a probability of the object belonging to one or more classes, and/or may include a portion of visual data associated with the bounding box. A portion of visual data associated with a bounding box may be the visual data (such as pixel values) corresponding to the inside of the bounding box, such as in a cropped image corresponding to each detected object. In some embodiments, the cropped image may be downsampled, and/or may include a surrounding portion of the bounding box. In some embodiments, the visual data may be included in the output of an inference engine in the case that the certainty of the object classification is low. Alternatively, or in addition, the output of a neural network may include a feature vector from a specified layer of a neural network, or a portion of a feature vector corresponding to the spatial location of the identified objects.

In some embodiments, an event detection may be based on a sequence of object detections from more than one video frame (image). In some embodiments, the object detections across multiple frames may be used to modulate the confidence associated with an object detection in any particular frame. For example, if an object is detected with high confidence in a first and a third frame, but with a lower confidence in an intervening second frame, the confidence of the object detection in the second frame may be increased based on the output of the first and third frames. Likewise, if an object is detected in the second frame, but not in surrounding first or third frames, the associated confidence might be decreased.

In addition to detecting driving events that may not be otherwise detectable, visual information may be used to classify a behavior in a context-sensitive manner. Returning to the example of running a red-light, typically, running a red light may be considered a 'bad' driving behavior. In some contexts, however, such as when a traffic guard is standing at an intersection and using hand gestures to instruct a driver to move through a red light, driving through a red light would be considered 'good' driving behavior. Additionally, in some contexts, a 'bad' driving behavior, such as tailgating, may not be the fault of the driver. For example, another driver may have pulled into the driver's lane at an unsafe distance ahead of the driver. Visual information may also improve the quality of a characterization that may be based on other forms of sensor data. Visual data may be used to determine a safe driving speed based on the observed speed of other drivers, for example, as described below. Several additional examples are provided in the following sections.

The costs associated with monitoring and/or characterizing driver behavior using methods of the present disclosure may be less than the costs of alternative methods that may use human inspection of visual data, or that may rely on certain types of sensors such as RADAR or LIDAR.

Apparatus Configured for Transmitting a Descriptor of an Event

In accordance with certain aspects of the present disclosure, visual data from a camera sensor may be processed at a connected compute device with an inference engine. The inference engine may be a neural network model running on a graphics processor (GPU), digital signal processor (DSP), or other hardware accelerator. The neural network, alone or in combination with data-based heuristics programmed to run on an application processor, may be used to infer measurements from the visual data. For example, the neural network may be trained to detect a traffic light, where detecting a traffic light may include identifying its location in the visual field of the camera as well as its state (red, yellow, or green).

According to certain aspects, monitoring a driver behavior may include collecting measurements relating to the movements of a vehicle in relation to lane markings on a road, in relation other vehicles, and/or in relation to other objects such as traffic officers, traffic signals, signs, and the like.

In accordance with certain aspects of the present disclosure, a classification of a driving behavior may be based on one or more measurements determined at a first device connected to a vision sensor that is affixed to a vehicle. In some embodiments, multiple measurements may be produced by a first inference engine running at a specialized hardware accelerator connected to a camera, as described above. The measurements may then be transmitted from the first device and received at a second device, where a number of measurements may be processed by a second inference engine. The second inference engine may be a neural network that is trained to classify a driving behavior based on measurements from the first inference engine. As with the first inference engine, the second inference engine may be a neural network running on a GPU, DSP, and the like, and/or a set of heuristics programmed to run on an application processor. The second inference engine may be located on a second device within a vehicle, such as at a centralized processing hub. Alternatively, or in addition, the second inference engine may be located at a remote location, such as at a cloud server.

FIG. 1 illustrates an embodiment of the aforementioned devices, systems and methods for transmitting a descriptor of an event. The device 100 may include input sensors (which may include a forward facing camera 102, a driver facing camera 104, connections to other cameras that are not physically mounted to the device, inertial sensors 106, car OBD-II port sensor data (which may be obtained through a Bluetooth connection 108), and the like) and compute capability 110. The compute capability may be a CPU or an integrated System-on-a-chip (SOC), which may include a CPU and other specialized compute cores, such as a graphics processor (GPU), gesture recognition processor, and the like. In some embodiments, a driver behavior monitoring system may include wireless communication to cloud services, such as with Long Term Evolution (LTE) 116 or Bluetooth communication 108 to other devices nearby. For example, the cloud may provide real-time analytics assistance. In an embodiment involving cloud services, the cloud may facilitate aggregation and processing of data for offline analytics. The device may also include a global positioning system (GPS) either as a separate module 112, or integrated within a System-on-a-chip 110. The device may further include memory storage 114.

A driver monitoring system, in accordance with certain aspects of the present disclosure, may assess the driver's behavior in real-time. For example, an in-car monitoring system, such as the device 100 illustrated in FIG. 1 that may be mounted to a car, may perform analysis in support of a driver behavior assessment in real-time. In some embodiments, real-time analysis may refer to a configuration in which visual data is processed at a rate that meets or exceeds the rate that it is captured. Alternatively, real-time analysis may refer to a configuration in which at least a sampling of the visual data is processed on a device connected to the corresponding camera soon after it is recorded. In these examples, the driver monitoring system, in comparison with a system that does not include real-time processing, may avoid storing large amounts of sensor data since it may instead store a processed and reduced set of the data. Similarly, or in addition, because the system may transmit a reduced set of data (for example, descriptors of objects that are detected in the visual data), rather than the visual data itself, the system may incur fewer costs associated with wirelessly transmitting data to a remote server.

A system enabled in accordance with certain aspects of the present disclosure may also encounter fewer wireless coverage issues. For example, a device mounted to a truck may have a memory capacity to store three hours of high-definition video captured by inward and outward facing cameras. If the truck is driven across a portion of the country that lacks reliable cellular network coverage, it may be unable to transmit a video for more than three hours, or transmission of a video may be slower than the rate of collection in such an area. In these cases, the memory may be used to store video until wireless coverage improves. Still, some video may be lost once the memory capacity is exhausted. In accordance with certain aspects of the present disclosure, a driver monitoring system may be configured to upload descriptors about the contents of the video data instead of the video data. Such a system may still be configured to upload video data that is determined to be salient for some purpose. In this example, the memory capacity corresponding to three hours of high-definition video data may instead be used to store multiple days of descriptor data alone with a reduced set of salient video data. Such a system may be less likely to be affected by wireless coverage issues because the memory storage may be sufficient to store data until the truck is again in a location with satisfactory cellular coverage, or until the truck encounters a Wi-Fi access point.

Figure 2:
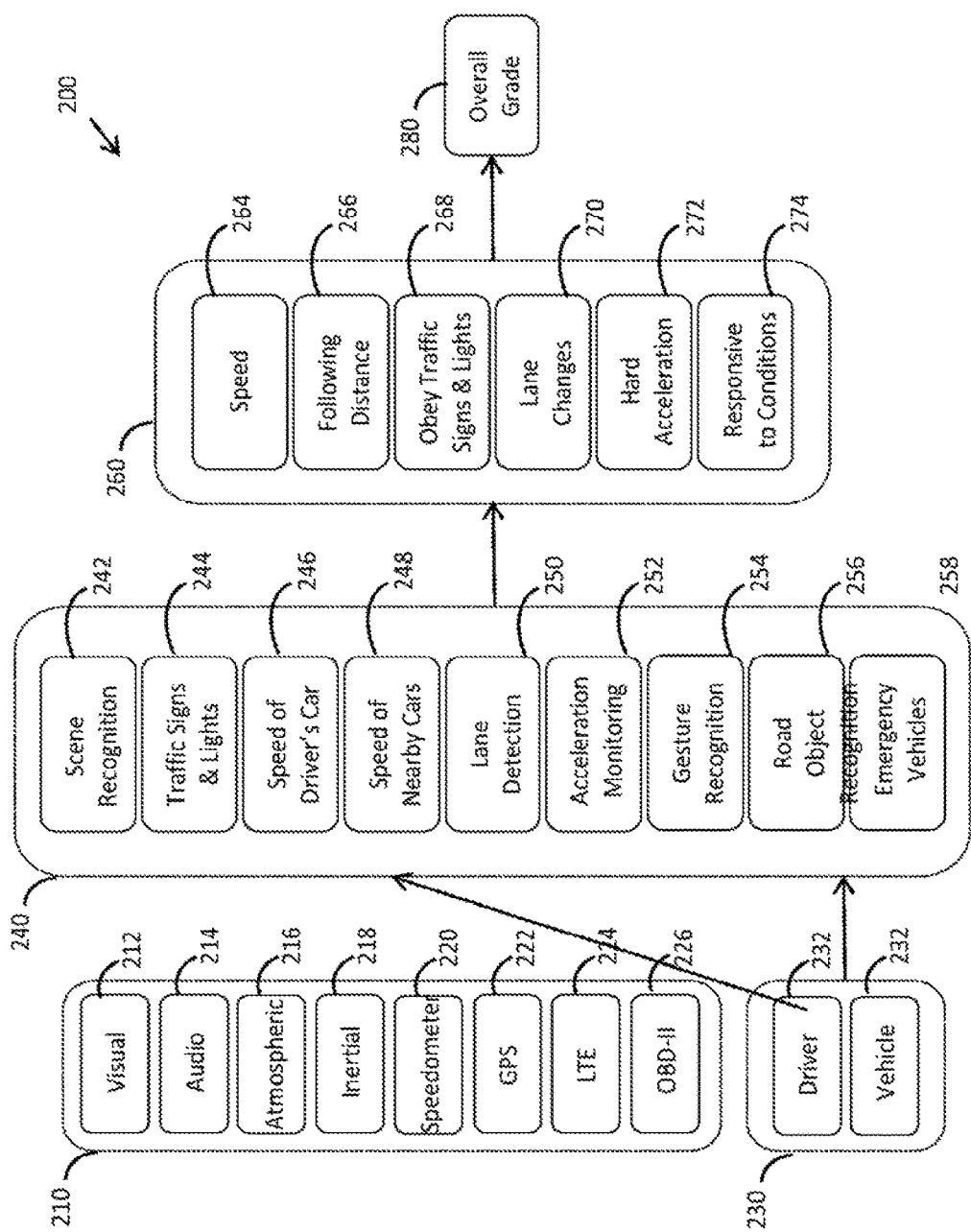
FIG. 2 illustrates an example of a driver monitoring system in accordance with certain aspects of the present disclosure.

A driver monitoring system, in accordance with certain aspects of the present disclosure, may assess a driver's behavior in multiple contexts. In addition, a driver behavior may be scored using more than one metric. FIG. 2 illustrates a system of driver monitoring in accordance with certain aspects of the present disclosure. The system may include sensors 210, profiles 230, sensory recognition and monitoring modules 240, assessment modules 260, and may produce an overall grade 280. Contemplated driver assessment modules include speed assessment 262, safe following distance 264, obeying traffic signs and lights 266, safe lane changes and lane position 268, hard accelerations including turns 270, responding to traffic officers, responding to road conditions 272, and responding to emergency vehicles. Each of these exemplary features is described in detail below. The present disclosure is not so limiting, however. Many other features of driving behavior may be monitored, assessed, and characterized in accordance with the present disclosure.

Speed Assessment

Certain aspects of the aforementioned driver monitoring system may be directed to assessing whether the driver is maintaining a safe speed 262, which may be based on traffic conditions, weather conditions, visibility, and the like. For example, a driver monitoring system, in accordance with aspects of the present disclosure, may read speed limit signs 244 using visual input 212 from a camera. The system may determine the car's speed 246 using one or more outputs of sensors 210 or sensor monitoring modules 240, including GPS 222, car speedometer 220 (using either an OBD-II type interface 226 or a visual camera reading of the dash), and/or visual speed assessment based on detected and computed relative motion of outside objects 256 (such as stationary sign posts). A driver assessment module 260 may then assess whether the driver is maintaining (or has maintained if the module is run at a later time) a safe speed 262 by computing a function of the two speeds, namely the posted speed limit 244 and the current speed of the driver 246.

In one embodiment, an assessment of driver speed 262 may be reduced to a grade, or score. The grading may include determining (a) if the driver is over the speed limit, (b) if the driver is over the speed limit by various amounts, (c) how much the driver is over the speed limit, or (d) a function of the difference of the two speeds. Such a function may include legally defined traffic fine step points.

A driver monitoring system may also include a determination of the driver's speed relative to speeds of other cars on the road 248. In this example, the grade of the driver may be based on the driver's speed 246 relative to the speeds of other cars 248, as well as the posted speed limit (which may be recognized by a traffic lights and signs recognition module 244). The driver may be graded negatively for going too slow or too fast. The driver grade may be more favorable if the driver is driving over the speed limit at a time when a determined percentage of other cars are also going approximately the same speed.

Furthermore, a driver monitoring system may determine recommended speeds from signs 244, such as signs placed near curves or in other caution areas. In this example, an assessment module may adjust the driver's grade as a function of the driver's speed and the recommended speed. For example, the driver grade for safe speed behavior may improve if the driver's speed is below the recommended speed in a given caution area, as well as below the legal speed limit of the road.

In an embodiment of the present disclosure, a driver monitoring system may determine based on visible signage 244 and other scene identifiers that may be recognized 242 that the car is in a safety sensitive area, such as a construction zone, school zone, day-time headlights required zone, and the like. In this example, an assessment module 262 may adjust the grade for safe speed behavior based on the recognition of the safety sensitive area. For example, the driver grade for safe speed behavior may improve if the driver's speed 246 is substantially below the speed limit in these zones (based on visible signage 244), even if the flow of traffic 248 is above the speed limit. In addition, the contribution to the grade for safe speed behavior may be weighted higher for these more sensitive zones and weighted relatively lower for less safety sensitive areas.

In another embodiment of the present disclosure, visual 212 or inertial sensors 218 may be used to determine if the vehicle is on an incline, and furthermore, whether it is traveling uphill or downhill. This determination may be added as an input to an assessment module for grading driver speed 262. For example, since a vehicle may have more problems stopping when going down a steep decline, the grading may reflect that traveling above the speed limit in these situations may have a more detrimental effect on the grade compared to travelling above the speed limit on a flat highway.

In another example, a driver monitoring system may be configured to detect and classify the type of vehicle being driven. Alternatively, the system may estimate the type of vehicle. In either case, the system may use the information about the type of vehicle 234 to select the relevant speed limit signs 244 on roads with different speeds for different vehicle types. For example, a road may have a posted 55 MPH speed limit for trucks and a 65 MPH speed limit for cars.

According to certain aspects of the present disclosure, a driver monitoring system may also use context to infer speed limits. For example, speed limits may be inferred on roads without marked speed limits or when a driver enters a road and speed limit signs have not yet been observed. A visual scene identification module 242 may determine that the road is a residential road and the GPS 222 may further indicate the locality. Based on these, the legal residential speed limit, such as 25 miles per hour (MPH), may be applied. Similarly, if the scene detection module 242 observes a school area and children present, the system may determine based on the output from the scene detection module 242 that the area is a school zone with the corresponding speed limit. The grading may be applied based on these estimated or inferred speed limits and the vehicle's measured speed 246.

A grading assessment for driver speed 262 may also be weighted based on the method used to determine the speed limit. For example, the contribution to the grade for safe speed behavior may be weighted lower when there is low certainty from the scene identification module 242.

A grading assessment may also provide more granular feedback to the user by, for example, breaking out grades associated with different detected scenes (based on the output from a scene recognition module 242). That may help educate drivers as to whether they are adjusting their behavior according to different driving situations.

A driver monitoring system may process stored data at a later time, in accordance with aspects of the present disclosure. For example, the system may keep track of the driver's speed 246 over time and then use an observed speed limit sign 244 to apply the speed limit over the recent past. In this example, the system may use visual 212, inertial 218, GPS 22, map, or other indications to determine the length of time that that the car has been on the same street and under the same driving conditions so that the observed speed limit would apply.

Safe Following Distance

Aspects of the present disclosure are directed to visually measuring the following distance 264, which is the distance to the vehicle directly in front of the driver's car. Several methods of visually measuring the following distance are contemplated. For example, a mono-camera 102 may be used to identify the type of vehicle being followed, such as a sedan, van, or semi-truck. In this example, the following distance may be based on feature sizes, such as width, or the relative feature sizes of multiple features associated with each type of vehicle. In another example, a machine learning model, such as a deep neural network, may be used to determine the distance based on the input pixels corresponding to the vehicle ahead. While the preceding examples utilize a mono-camera, the present disclosure is not so limiting. In another example, other sensors, such as RADAR, Ultrasound (SONAR), or LIDAR, may be used to determine the distance to the vehicle ahead. In addition, multiple methods may be combined to estimate the distance.

In an embodiment of the present disclosure, a driver monitoring system may determine the speed of the driver's vehicle 246 and the speed of the vehicle ahead 248. The system may then assess the driver's safe following behavior 264, and determine a safe following grade as a function of the distance to the car and the speeds of the vehicles. In addition, the system may further determine the speed of other traffic 248 and may incorporate the speed of other traffic in the assessment of the driver's safe following behavior 268.

In another embodiment of the aforementioned driver monitoring system, the determined following distance may be converted from a unit of distance, such as from feet or meters, to a unit of time, such as seconds. In this example, the assessment of safe following behavior 264 may be based on this inferred measure of following time. The driver grade for safe following behavior may be computed as a function of the following distance in time, and may also be based on the estimated stopping time based on the current speed of the car 246. For example, driving with less than 2 seconds following time while travelling 30 MPH, or driving with less than 5 seconds following time while travelling 65 MPH may result in a reduction in the driver's safe following grade.

In the present example, the method of determining the following distance may involve a computer vision model in accordance with certain aspects of the present disclosure. For example, the determination of following distance may involve recognizing the type of vehicle ahead along with the make and model of the vehicle, determining dimensions of the vehicle based on the make and model, computing the observed dimensions of the vehicle, and estimating the distance based on the relationship between the observed and known vehicle dimensions.

Obeying Traffic Signs and Lights

Aspects of the present disclosure are directed to determining the extent to which a driver obeys traffic lights and signs 266, such as stop signs, yield signs, do not enter signs, and the like. A driver monitoring system may use visual input 212 from a camera to detect traffic signs and traffic lights 244. The system may assess the extent to which the driver is following the traffic signs, or has followed traffic signs in the case that the assessment is made at a later time. This assessment may include recognizing the intersection markings at a traffic light 244, and determining whether the driver was in the intersection before the light turned red. The assessment may also include determining the distance to the intersection when the light turned yellow and whether the driver appropriately stopped or passed through the intersection. Further, this may be based on the driver's speed 246, which in turn may be based on a reading of the speedometer 220, or accessed via an OBD-II 226.

In another example of an assessment of obeying traffic signs and lights 264, the visual 212 system (alone or in combination with other sensors 210) may measure how much time has elapsed between the light turning green and the vehicle starting forward. This measurement may be used to assess that the driver is being responsive to traffic signals. In this example, the visual signals 212, RADAR, LIDAR, and/or other systems may detect if there are cross traffic vehicles that are crossing through the intersection or rapidly approaching the intersection. If so, the assessment module 266 may positively grade the driver for waiting at a green light if the waiting could be interpreted as a precaution to ensure that the cross traffic vehicles will safely stop for their red lights. Likewise, a pedestrian may be detected based on visual data, and the driver may be graded positively for waiting at a green light if the waiting could be interpreted as waiting for the pedestrian to finish crossing the street in front of the driver.

The driver monitoring system, in addition to monitoring and assessing driver behavior 260, may additionally monitor the behavior of traffic lights and other signals and the behavior of other drivers on the road. For example, according to aspects of the present disclosure, the driver monitoring system may measure traffic light times 244, and determine, for example, that the yellow light duration does not meet the legal minimum duration. This may be used for contesting traffic infractions or notifying the government.

Aspects of the present disclosure may be directed to monitoring driver behavior in response to yield signs. Upon encountering a yield sign (or at a later time if the system is not run in real-time), the driver monitoring system may visually 212 recognize the yield sign 244 and then observe the distances to on-coming vehicles. Based on these measurements, the system may make an assessment 266 that positively grades the driver for yielding when the on-coming vehicles are too close. The system may also positively grade the driver for not yielding when the on-coming separation is beyond a measured margin, since such behavior indicates alertness and may result in increased fuel efficiency Additionally, there may be instances in which observed traffic signs 244 do not actually apply. For example, a construction stop sign may be left by the road accidentally. In such cases, a visual sub-system may use scene detection 242, possibly in conjunction with other methods for determining context to assess whether the observed sign actually applies. For example, the driver monitoring system may connect to a cloud service via LTE 224 to use crowd sourcing to determine that most drivers do not obey the observed traffic sign, and therefore infer that this traffic sign should not be considered in an assessment of driver behavior, particularly an assessment of the extent to which the driver is obeying traffic signs 266. Likewise, based on the combined outputs of multiple driver monitoring systems, the cloud service may determine that a particular traffic sign is invalid. The cloud service may then notify appropriate government or other groups to the inappropriate traffic sign, in accordance with aspects of the present disclosure.

Aspects of the present disclosure may be directed to monitoring and assessing driver behavior at railroad crossings. The driver monitoring system may detect the railroad crossing (either visually and/or via mapping services), and may then grade the driver based on specific settings. For example, school buses may have a policy setting of stopping at all rail road crossings. In this example, the vehicle profile 234 may indicate that the driver being monitored is driving a bus, and the obey traffic signs and lights assessment module 266 may incorporate this indication in the assessment of driver behavior.

The visual system 212 may also be used to help determine the car's velocity 246 and either alone or in conjunction with inertial sensors 218 and/or GPS 222 may determine whether and where the car came to a complete stop. For example, GPS error rates may make it difficult to assess whether the car stopped before or on the railroad tracks when waiting for a traffic light, while a visual road object recognition system 256 may more accurately make that determination.

Figure 3:
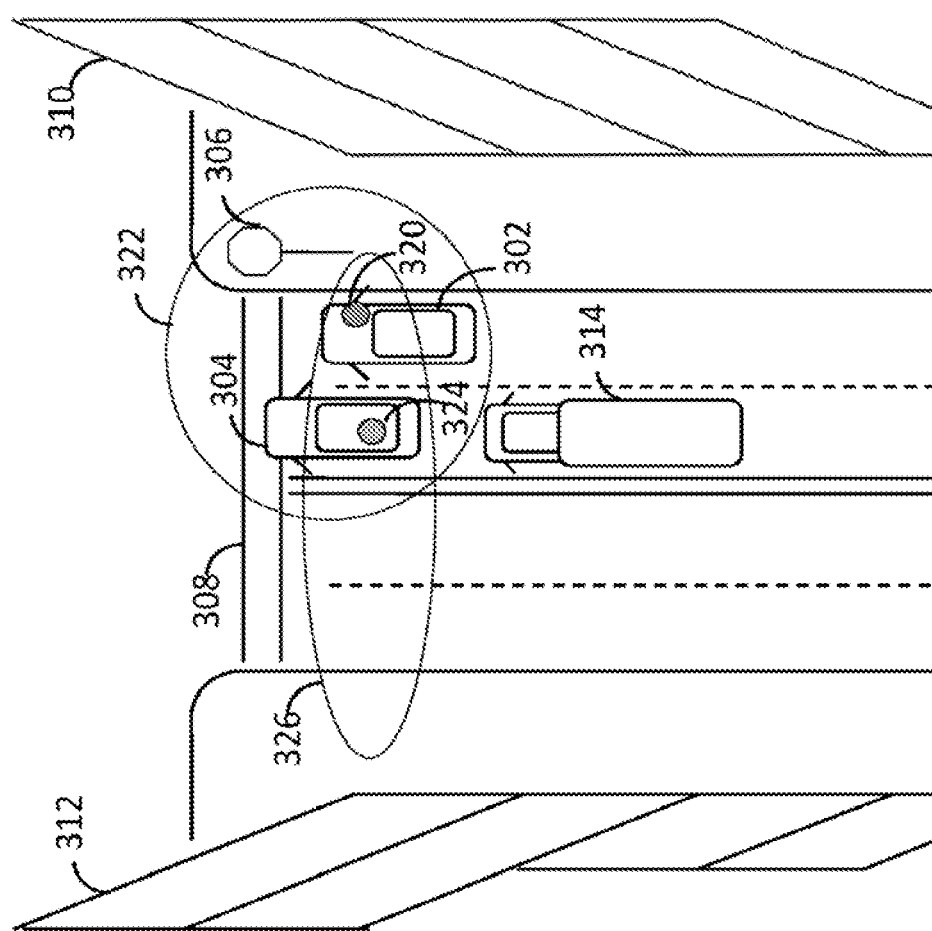
FIG. 3 illustrates the use of global positioning information to determine a driving behavior.

FIG. 3 illustrates an advantage of using visual information to determine whether a driver came to a complete stop at an intersection, in accordance certain aspects of the present disclosure. In this illustration, a first car 302 and a second car 304 arrive at a stop sign 306 and each car comes to a complete stop. The first car 302 stops before the crosswalk 308. The second car 304 enters the crosswalk 308 before stopping. The intersection is located in an urban area, with large buildings 310 and 312 on either side. In addition, there is a large truck 314 positioned behind the second car 304. The large buildings and the truck may interfere with a GPS system by blocking direct line of sight readings from GPS satellites. The first car has a GPS receiver unit 320 installed near the front right portion of the windshield. The second car has a GPS receiver unit 324 installed near the rear of the hood of the car. The GPS unit 320 of the first car computes an uncertainty of its location as determined by the GPS reading in the car. The uncertainty is circular ring 324 that is centered on a location that is close to, but not exactly coinciding with the true location of the GPS receiver unit. The GPS unit 324 of the second car computes an uncertainty of its location as determined by the GPS reading in the car. The uncertainty is an elliptical ring 326 that is centered on a location that is close to, but not exactly coinciding with the true location of the GPS receiver unit. Because the buildings 310 and 312 are on the right and left sides of the car, the GPS unit of the second car calculates greater uncertainty in the right/left axis compared to the forward/back axis. Based on the measured uncertainties of the GPS units, it may be more likely that the first car infers that it did not stop before the crosswalk and that the second car infers that it did stop before the crosswalk, even though the opposite is true in this illustration. In this instance, a visual input 102 that could recognize 244 the traffic sign 306 or other road markings, such as the crosswalk, could give a more accurate estimate of the true position of each car relative to the crosswalk. In turn, an assessment module that assesses the extent to which a driver obeys traffic signs 266 could make a more accurate assessment based on visual input 212 rather than GPS 222 alone.

Safe Lane Changes and Lane Position

Aspects of the present disclosure may be directed to assessing the quality of lane changes and lane position 268. For example, a driver monitoring system may use either visual 212, RADAR, LIDAR, or other systems 210 to determine the relative positions of vehicles around the car. The driver monitoring system may then assess the driver's aptitude in maintaining a safe location, such as not driving next to cars in adjacent lanes, but rather maintaining an offset in position. During lane changes, the driver monitoring system may assess the driver's ability based on the relative distances and speeds of the driver's car 246 and nearby cars 248 when changing lanes. In addition, this assessment may be based on whether and when the driver signaled lane changes, which may be accessed via the OBD-II 226.

A driver monitoring system may also observe road markings, such as solid yellow lines or dashed yellow lines, and note if the driver inappropriately crosses over solid yellow lines, or solid white lines in the case that the driver crosses into a car pool lane outside of the designated entry locations.

A driver monitoring system may also determine the rate of closure of cars in adjacent lanes and use that rate of closure to modify the driver assessment. For example, if a driver changes into a lane with a fast-approaching car, the distance threshold for an assessment of the safety of a lane change may be greater than it would have been if the approaching car were going about the same speed as the driver's car.

The driver monitoring system may be configured to estimate the fault of an unsafe driving behavior or context. For example, a driver's safe following distance behavior may be scored negatively if the driver is closer than a safe following distance to the vehicle ahead. However, the system may determine that another driver swerved in front of the driver and thus caused the unsafe following distance. In this case, a safe following assessment may be adjusted for the driver since the unsafe driving behavior may have been a fault of the other driver. A device configured according to certain aspects of the present disclosure may infer a trajectory of the other driver by detecting the position of the other driver's vehicle in relation to the driver. For example, the trajectory may indicate that the other driver had been in an adjacent lane just a few seconds before the detected tailgating event, and thus infer that the driver had crossed in front of the driver to cause the event.

In one embodiment, the driver monitoring system may track lane markings 250 or estimate lane separations, determine the car's position with respect to the lane markings, and assess the extent to which the driver maintains a safe lane position. For example, a driver may be graded up (or positively) for maintaining a center location, and may me graded down (or negatively) for getting too close to lane edges or crossing over lane edges outside of the context of a lane change. In addition, an accelerometer 218 may be used to detect freeway rumble ridges, infer crossing into the shoulder, and based on the detected rumble ridges, the driver's behavior may be graded down. Still, the visual system 212 may be used to adjust the grading if it recognizes a construction zone with a scene recognition module 242 or recognizes construction cones with a road object module 256 directing vehicles into the shoulder, for example. Other methods, such as crowd sourcing in the cloud across drivers, which may be accessed via LTE 224, may also be used to determine exceptions. For example, if many drivers are making the same violation at about the same location, it may be determined that an exception condition is likely.

No Hard Turns, Hard Accelerations Hard Starts

In one configuration, a driver monitoring system may assess the driver's behavior with respect to fuel inefficient maneuvers, such as hard starts or hard accelerations 270. An assessment module 260 may include an assessment of acceleration 270, which may be based on a measurement of the rate of acceleration 252 using one or more of visual 212, GPS 222, inertial sensors 218, or car speedometer 220. The acceleration assessment module 270, in accordance with certain aspects of the aforementioned systems and methods of classifying a driving behavior, may have a threshold on the amount of acceleration and may note a violation. Alternatively, or in addition, the module may note a series of gradations of acceleration behavior. The visual system 212 may help measure a more accurate range of accelerations by visually assessing the rate of change of the road way or other stationary objects. In one configuration, the visual system 212 may overcome limitations associated with other sensors. For example, accelerometers 218 may have a maximum measured acceleration, such that the accelerometer may output a clipped signal in the case that the maximum is exceeded. Likewise, a GPS 222 measurement uncertainty may give false alarms and mis-detects. In another configuration, a combination of devices and sensors 210 may be used to measure acceleration and thereby assess a violation.

Responding to Traffic Officers

In one configuration, the driver monitoring system may assess the driver's behavior with respect to responding to traffic officers. A responsiveness assessment module 272 may use the camera to visually recognize traffic officers and categorize their hand signals 254. The driver monitoring system may then assess the driver's performance responding to the traffic officers. This may also be used to assess the driver's performance in other assessment modules by issuing an exception. For example, responding to a traffic officer 272 may be a higher priority than obeying traffic signs or lights 260.

Road Conditions, Potholes, Objects

Aspects of the present disclosure may be directed to assessing a driver's behavior in response to road conditions 272, including the presence of potholes and objects on the road. For example, the driver monitoring system may classify the road conditions using visual sensor 212 information alone or in combination with inertial sensors 218, or potentially from cloud service provided information via LTE 224. The driver speed assessment 262, following distance assessment 264, and other assessments 260 may be modified based on the road conditions. For example, the road conditions may influence the determination of a safe driving speed 262, which may be used by other assessment modules 260. The safe driving speed may be based on the posted speed limit 244 and then scaled (either linearly or multiplicatively) by the road conditions. Alternatively, the driver monitoring system may determine a maximum safe speed for the recognized road conditions and the safe driving speed may be determined as the minimum of the determined maximum safe speed for the recognized road condition and the posted speed limit.

In one configuration, the driver monitoring system may visually detect and categorize potholes and objects in the road 256 and may assess the driver's response to those objects. For example, a responsiveness assessment module 272 may positively grade the driver for avoiding a pothole. The monitoring system may also modify the assessment based on the location of other cars. In this example, the responsiveness assessment module 272 may positively grade the driver for running over a pothole if the position and velocity of other cars would have made avoiding the pothole dangerous. The detection of road objects 256 by the monitoring system may also modify other assessments, such as the assessment of maintaining good lane position. Typically, an assessment of the driver's maintenance of good lane position would be negatively affected by a swerving maneuver. However, an exception would be raised based on detecting that the cause of the swerving was to avoid obstacles. In addition, the driver monitoring system may assess the safety of the avoidance maneuver based on the distance to other nearby vehicles.

Emergency Vehicles

Aspects of the present disclosure may be directed to assessing a driver's behavior in response to emergency vehicles. For example, the driver monitoring system may identify the presence of emergency vehicles using an inference engine 258 that may detect sirens based on audio 214 and/or visual 212 input. The driver monitoring system may then assess the driver's responsiveness 272, by determining, for example, whether the driver pulled over to the side of the road.

In one configuration, the driver's situational responsiveness could be inferred based on audio input 214. For example, road noise may be used to determine traffic conditions and/or the presence of honked horns. Furthermore, multiple microphones with beam-forming may be used to help localize the direction to the emergency vehicle, car, or train horn.

General Grading Features

A driver behavior may be monitored and/or graded repeatedly over time. In an embodiment in which a driver behavior is monitored, descriptors of a visual scene may be determined at a device connected to a camera in the vehicle. Most or all of the descriptors may be transmitted to a second device, even for periods in which the driving behavior cannot be detected. For example, a system configured to monitor whether the driver comes to a complete stop at a stop sign may transmit a substantially continuous stream of descriptor data to the cloud, or to another device such as a centralized analytics hub in the vehicle. The monitoring system directed to stop sign behavior may therefore take into account the frequency with which stop signs are encountered, as well as make other inferences associated with time periods in which no stop signs are present. A driver's grade, which may be based on the aggregated descriptors, may be plotted over time. The driver grades may also be averaged to determine a score per time period, such as per hour, day, week, month, or year. The averaging may be an equal weighted arithmetic average, or it may be some other averaging over time. The grading may include different weightings for the assessments of different types of driving behavior features 260, for example, an assessment of merging safely 268 may be weighted higher than an assessment of hard starts 270.

The methods of grading particular behaviors may be modified based on driving conditions. For example, the weightings of different driving behavior assessments may vary based on a recognized context such as a combination of road conditions, traffic 248, and other recognized features of the environment 242. For example, the weighting over time of safe speed behavior may be higher for riskier environments, so that the contribution of the driver's speed behavior 262 to the overall grade 280 will be higher at these times. Examples of riskier environments may include construction areas, poor weather conditions (such as snow), or poor visibility (such as fog). In one configuration, the weather conditions may be determined based on visual inference 212, from an atmospheric sensor 216, from a cloud service accessed via LTE 224, or a combination thereof. The driver monitoring system may also use inertial sensors 218 as an input to an inference engine 240 to assess if the vehicle is maintaining or losing traction, and may thus infer slippery road conditions and that the safe driving speed behavior assessment 262 should have a larger impact on the overall grade 280 at these times. While the previous examples describe varying the weights of different driver behavior assessments, other context-based adjustments are also contemplated. In one configuration, the weather or environment conditions may vary the target threshold values within an assessment module 260. For example, the threshold for safe following distance 264, safe speed of travel 262, or safe lane change 268 may be modified in response to observed weather or traffic conditions 248.

In one configuration, descriptors of events in visual data and/or classifications of driving behaviors may be computed or stored for averaging over specified contexts, such as environments, areas, or times. For example, the driver's grade 280 may be based on behaviors that were monitored while the driver was in school zones, as determined by a scene recognition module 242.

Alternatively, or in addition to averaging, the driver monitoring system may accumulate a number of events and use these events as the basis for determining a grade for the driver 280. An event may be, for example, a time when the driver's speed 246 exceeded 5 MPH over the posted speed limit 244. The detection of an event may be associated with a reset time, such that new events of the same type will not be detected again until after the reset time has elapsed.

The driver monitoring system may also capture a clip of violation events, or violation events above a given rating. These clips may be reviewed with the driver at a later time, and may include video data as well as other types of data.

According to certain aspects of the present disclosure, data may be transferred to the cloud from the driver monitoring system, which may be considered a client. In one embodiment, the amount of data transfer from the client to the cloud may be based on wireless bandwidth considerations. For example, the client and/or cloud may actively manage the amount of data transfer to remain under specified bandwidth usage limits. For example, the client may be configured with a monthly bandwidth allocation. In this example, the client may measure the utilized bandwidth throughout a month, and may adjust a threshold for a real-time event communication trigger as a function of the utilized bandwidth and the monthly bandwidth allocation. For example, the function may include a ratio of the utilized bandwidth to the monthly bandwidth allocation. In one embodiment, the aforementioned driver monitoring system may be configured to report speed violations. In this example, if the ratio of utilized bandwidth to the monthly bandwidth allocation is low, then the threshold for reporting speed violations may be set to a low value, such as 5 MPH. As the ratio goes higher, the threshold may be adjusted higher. For example, if the ratio of utilized bandwidth to the monthly bandwidth allocation goes above 25%, the threshold for reporting speed violations may be increased to 10 MPH over the speed limit.

In another example, the resolution of a picture or video clip may be adjusted based on wireless bandwidth considerations. For example, the amount of data transferred between the client and the cloud may be adjusted based on the ratio of a remaining bandwidth in a monthly bandwidth allocation to the size of the monthly bandwidth allocation. In this example, if the ratio is high, then a high-resolution video clip recorded around the time of an event may be sent to the cloud for further processing. If the remaining bandwidth drops, the video resolution, and hence the video size, may be reduced for the current data transfer and/or for future data transfers in the same month. Other means for reducing the bandwidth of data transfer may be used, such as reducing the frame rate, adjusting the ratio of predicted picture frames (P-frames) to intra-coded picture frames (I-frames), adjusting an amount of lossy compression applied, or adjusting a trade-off between sending full image clips and sending cropped image around objects of interest.

In one embodiment of the aforementioned driver monitoring system, the client device may send processed analytics to the cloud. For example, the client may transmit descriptors of detected objects and/or a driver grade to a device in the cloud, or the client may send a driver grade or a descriptor of a detected object along with a confidence value. In these examples, the cloud may make a determination to request additional data, such as video clips upon which the processed analytics were based. A request for additional data from the client device may be triggered by a request from a human. For example, a client device may send a message to the cloud that a certain event has occurred, and the cloud may notify the driver's supervisor of the event. In this example, the driver's supervisor may request a video clip associated with the event for additional review. The cloud may also be configured to request specific clips and data if they correspond to milestone markers. For example, the device may communicate data to the cloud indicating that the driver has reached an extra safe driving status, and the cloud may request additional data to verify the assessment. Similarly, the device may be configured to communicate to the cloud when the driver has exhibited a certain level of unsafe driving, and the cloud may then request additional data.

In one configuration, the system may assign separate grading scores for different events. In this configuration, the system may separate the grading of driver behavior into first, identifying 'unsafe' events, and second, determining whether the driver is responsible for those events. The system may determine responsibility by computing as estimate of driver fault based on a trained machine-learning model. Referring to Appendix A, a driver grading system may assign scores using a reinforcement learning approach. The machine learning may be implemented using a Deep Neural Network, Support Vector Machine (SVM), or some combination thereof. Inputs to the machine learning system may be feature vectors over N frames, such as the last N frames prior to the detection of an unsafe event. At the next time step, the inputs to the machine learning algorithm may be time stepped by M frames such that if at t0 the inputs are feature vectors from frames 0 . . . N, then at t1, the inputs are from M . . . N+M, and so on. In this example, a feature vector could include a car speed, a lane position, the relative position of other cars, and/or the relative position or distance to pedestrians. The speed and/or other data for the feature vector may be obtained from the OBD-II port. The feature vector may also include GPS data.

Driver grading for an event may be represented as a tuple, with the first score representing the severity of the risk, and the second score representing the level to which the driver is at fault for the 'unsafe' event. Over the course of operation, the driver grading may output an N-tuple/(event) or N-tuple/(a set of events), where different scores represent performance for different types of driving behavior. As an example, there could be a score for lane driving, a score for tailgating, a score for obeying traffic signs, etc. In this example, each of these scores is a field of the N-tuple, and each score may have a second field indicating an estimate of the driver's responsibility for each 'unsafe' event.

According to certain aspects of the present disclosure, the amount of data transfer from the client to the cloud may be based on wireless bandwidth considerations across multiple driver monitoring system clients. For example, the cloud may aggregate a total bandwidth for a month, and may allocate more or less bandwidth to specific client devices based on various metrics. In this example, metrics may include a degree of agreement of client scores with cloud scores, a driver status, or a measure of the overall remaining bandwidth. In this example, the cloud server may choose to reallocate bandwidth from drivers with fewer events to drivers with more events.

According to certain aspects of the present disclosure, the amount of data transfer from the client to the cloud may be adjusted differently in response to bandwidth considerations based on the type of event being communicated. For example, the thresholds at which different types of events are communicated to the cloud may be adjusted differently. In one example, the adjustment of the amount of data transfer may be done in such as way that some event types stop reporting for the remainder of a month. For example, if the bandwidth usage ratio reaches 80%, speed limit violations may stop being reported, although hard stop events may continue to be reported. There may also be some events that continue to be reported even after the monthly limit is exceeded; for example, if a collision is detected the video clip around the collision may be sent even though the data transfer would exceed the allocated limit and may incur additional transmission costs.

In addition, events that are not transmitted in real-time or near real-time may be cached and transmitted later over a different link, such as Wi-Fi, or at a different time, such as the beginning of the next month. If events are cached for transmission at a later time, the cached event transmissions may be limited to a certain usage of the next month's bandwidth allocation. For example, the first 10% of cached events may be transmitted at the start of a new month. Alternatively, the set of cached events may be graded and ranked, and the most severe events may be transmitted. Similarly, this approach may be used for managing the memory usage of cached event clips and data if memory storage on the device 114 nears full capacity.

Many of the features described above may be determined based on visual indications of stationary objects, such as traffic signs 244. Visual indications of stationary objects may also be crowd sourced via the cloud, in accordance with aspects of the present disclosure. For example, cars may send their GPS coordinates to the cloud via wireless connectivity such as LTE 110 at points where they detect a change in the road characterization 242, such as a change of speed limit or start of a construction zone. The cloud may keep track of different road segments, and may provide this information to other driver monitoring systems. In addition, the driver monitoring system may periodically report the car's position to the cloud service, and the service may send back its estimate of the road features that the car should expect to observe. This may increase robustness of road feature detection. For example, it may decrease the uncertainty associated with detecting and/or recognizing traffic signs that are obscured by other vehicles. It may also increase robustness of the sensory recognition systems in night-time versus day-time lighting. The crowd sourced system may also reduce classification errors overall.

Crowd-sourcing may also be applied to real-time (dynamic) features, such as weather, visibility, and traffic conditions. In this example, the driving monitoring system may adjust its grading in real-time in response to the crowd-sourced recognition of road conditions.

In one configuration, GPS could be used to correlate car locations to sensor data recordings from an automobile. Alternatively, or in addition, car locations could be inferred by matching visual features in the camera data stream. In this example, matching may include identifying distinctive intersections or roadways such as iconic landmarks, or recognizing signage including mile markers and highway markings. Still other methods of determining car location are contemplated. For example, short-term dead reckoning may be based on the output of inertial sensors 218.

Computational Efficiencies

In accordance with certain aspects of the present disclosure, the processing 110 of camera inputs (for example a forward facing camera 102 or a driver facing camera 104) of an exemplary driver monitoring device may be computationally burdensome. Several methods to improve the efficiency of camera input processing are contemplated. In one configuration, a focal zone may be defined based on the measured speed of the vehicle 246. For example, a focal zone may be an area of interest of the visual scene in which objects that may interact with the vehicle in the near term are likely to be found based on the speed of the vehicle. A focal zone may also refer to a range of scales in multi-resolution processing. For example, if the vehicle is traveling at slow speeds, the focal zone may be configured to search for pedestrians that would be closer than 150 feet. This may be used to reduce the pedestrian search space and therefore improve camera input processing times. The search space may be reduced either spatially (to only look in the lower areas of the camera input), or the search space may be reduced in scale (to only search for pedestrians larger than a determined size). While the previous example is directed to a reduction in search space based on vehicle speed, the present disclosure is not so limited. The search space selection may be based on a number of factors including the vehicle speed 246, the vehicle environment 256, the search objects, and others.

While the previous example is directed to limiting a visual search to just searching one zone, other means for increasing computational efficiency are contemplated. In one configuration, there could be several focal zones, for example a near focal zone, medium distance focal zone, and a far focal zone. In another configuration there may be a focal zone in front of the vehicle, a focal zone near the vehicle but to the side, and or a focal zone farther from the vehicle. In addition, different focal zones could be associated with different priorities, and the different focal zones may be processed with different levels of computational complexity. For example, higher priority focal zones may be searched at a higher frequency compared with lower priority zones. Alternatively, or in addition, higher priority focal zones may have more complex and accurate search models than lower priority zones. Alternatively, or in addition, higher priority zones may be searched at a finer window step size than lower priority zones. According to aspects of the present disclosure, the lower priority zones may be the portions of the image and image resolutions that are not identified as high priority focal zones.

In one configuration, the image may be to divided into large sections, such as 8 sections, and an inference engine may be run on each of the 8 sections to determine if an object, such as a car or person, is present in each of the 8 sections. The subset of sections in which the object was detected may be further subdivided and the inference engine run on the subdivided sections. This process may be iterated to further subdivide the image so that a detection algorithm (such as selective search or multi-window multi-scale, etc) that may be of higher computational complexity, may be run over the subsections that tested positive.

In the previous example, the image may be divided into overlapping subsections. In one configuration, the initial inference engine used on the first 8 sections may be a convolutional neural network. The convolutional operations may be run over the entire image to compute the presence of the object in each of the 8 sections at the top of the iterative processing chain to further save computational resources by reusing computations associated with the overlapping portions of the 8 sections. Likewise, the convolutional operations may be run on each of the identified subsections.

Combined Learned Grading System

The aforementioned driver monitoring systems may include a general assessment system 260 that may be based on a set of modules 240. A combination of modules may determine the car and environment status using a mixture of cameras 212, inertial sensors 214, GPS 222, cloud data 224, profile data 230, which may include vehicle 234 and driver profiles 232, and other inputs 210. These inputs may then be the basis of a plurality of inferences 240 and grades 260 based on engineered rules.

Alternatively, or in addition, the grading system 260 that is based on the car and environment status determining systems may be a machine learned model that was trained to match expert human labeled grading scores to environment values. The machine learned model may be applied to obtain a subset of grading values 260 or a combined value 280. In comparison to engineered rules, the machine learned grading system may evaluate grading features for complex scenarios that may not have been considered by the engineers that designed the behavior assessment rules.

In one configuration, the visual system 212 and grading systems 260 and 280 may be trained end-to-end. Rather than training the visual system for cars 248, pedestrians, lanes 250, distances, and so forth, and then a system on top to match grading scores 260, the system may be trained end-to-end such that grading scores 260 are computed directly from sensory data 210. Still, the training procedure may start with training certain subsystems 240 independently, and then performing full end-to-end training on a combination of subsystems 240 and sensory inputs 210, such as by back propagation. This training procedure may result in the detection of more fine-tuned visual features which may be the basis for more accurate driver assessment scores 260.

In some embodiments of certain aspects of the present disclosure, a driving behavior may be classified directly based at least in part on visual data from the camera. This configuration contrasts with some exemplary embodiments described above that may first detect an event and determine a descriptor of the event at a first device, then transmit the descriptor to a second device where it may be used to classify a driving behavior. Instead, in some embodiments, the step of determining a descriptor may be skipped. For example, a camera may be affixed to a vehicle, and a device may be attached to the camera through a shared memory, a wired connection, a wireless connection such as Bluetooth, and the like. A first device may receive visual data from the camera and may then directly classify a driving behavior based on the visual data and an inference engine. The inference engine in this example may be neural network that was trained in an end-to-end fashion, as described below. The inference engine may compute a classification directly from visual sensor data, and may further include as an input other sensor data. For example, an end-to-end inference engine may take raw inertial sensor data as an input, may take calibrated inertial sensor data as an input, or may take processed sensor data, such as location estimates from a GPS module. Accordingly, the system or device may determine the classification of the driving behavior at the same device that received visual data from the camera. The classification data may then be transmitted to a second device, where it may then be used for a variety of applications, including driver monitoring.

In comparison to a system that may split the classification of a driving behavior across more than one inference engine, and system having an end-to-end inference engine may be considered to have some advantages and some disadvantages.

A split system may achieve a desired classification performance based on less training data in comparison an end-to-end system. For example, a split system may be include separate modules, each of which may detect events relating on one aspect of driving behavior. For example, one module may detect other cars or trucks on the road, while a second module may detect traffic lights. In some embodiments, these two modules may share some common processing steps, such as a common trunk of a deep learning network. Each of these modules may be trained with a number of examples covering a variety of relevant objects that might be encountered. For example, a car and truck detecting inference engine may be trained on labeled car and truck data. In contrast, an end-to-end system may be considered to achieve a desired classification performance after it may reliably classify driving behavior as safe or unsafe. Relevant training data (such as sensor data corresponding to unsafe driving scenarios) may be less frequently encountered in comparison to, for example, visual data containing other cars or trucks. For this reason, an end-to-end inference engine may be more challenging to train.

In comparison to a split system, an end-to-end system may transmit less data. This may be desirable, for example, if there are many systems in accordance with the present disclosure deployed by an operator, such as a fleet manager. The additional data from a split system, however, may have additional utility. For example, while it may be used for monitoring driver behaviors, the descriptors of objects transmitted from a deployed split-system may more readily be used for additional purposes. For example, the additional data may be used to compute typical patterns of observations and may thereby identify an occurrence of a rare event for which a classifier has not yet been trained.

Considering the trade-offs between split and end-to-end inference engines, it may be desirable to employ a split inference engine when relevant training data is scarce, and then gradually adopt a more end-to-end inference engine as the availability of training data increases.

Unsupervised and Reinforcement Learning

In addition to, or instead of, matching human labeled driver assessment scores, unsupervised and reinforcement learning may be used to lessen or avoid laborious human labeling. These approaches may help create a driver monitoring system that is robust in cases in which human labeled assessments may be in conflict with each other. Examples of such cases include swerving to avoid obstacles in the road, passing a construction stop sign that is not supposed to be active, or following a traffic officer's directions over road signage.

In one configuration, hand coded rules could be used to determine initial training values for initializing a system. The system may then be further trained and updated using reinforcement learning.

In one configuration, a crowd sourced reinforcement learning approach may be used. In this example, the driver monitoring system may crowd source issued traffic infractions across drivers, and use those to label unsafe or inappropriate driving actions. The visual system may also identify police cars. A reinforcement learning rule may use training examples in which drivers were near police cars. The learning rule may be based on rewarding the driver behaviors for which the drivers did not receive an infraction, and penalizing the driver behaviors for which the drivers did receive an infraction. Similarly, if a driver gets in an accident, the sensor data preceding the accident may be used as an input to a reinforcement learning rule to adjust the grading system inference engine.

In one configuration, the infractions, traffic accidents, and the like may be used as a supervisory signal and crowd sourced to train an inference engine that outputs an estimate of the probability of a traffic accident or infraction based on the input sensor data. An updated model may be pushed out periodically to the driver monitor systems to improve the quality of the systems. In this example, the updated model may be used to update or replace an inference engine on the device. Configured with an updated inference engine, an enabled device may exhibit improve driver behavior monitoring. For example, it may subsequently upload a higher ratio of relevant to irrelevant video clips to a cloud server.

According to certain aspects of the present disclosure, the driver monitor system may also utilize a prediction engine to forecast different paths that the driver could take or could have taken in a given situation, and compute the infraction and/or accident probabilities along those paths, and then score the driver based on the path taken compared with the other paths. The score may be compared with the best path, the top percentile best path, the average path, or other measures.

In one configuration, the driver assessment score may be the Q-score for a Q-learned reinforcement learning model. For example, if the expected score is based on negative points for infractions and accidents, then the driver monitoring system may note if the expected future score goes below a given threshold indicating a higher expected negative event.

In one configuration, the driver monitoring system may assume that the typical driver behavior in a given situation is a good behavior. For example, an inference system trained to classify environments could be run on the inputs to get a feature vector, and the feature vectors could be clustered, such as by k-means clustering. This clustering of feature vectors associated with environments may give an unsupervised categorization of the different crowd sourced environments. For example, the set of data for a given cluster may be considered the features of an environment based on an unsupervised categorization. Based on the categorization of the environment, the next frames of sensor data, which may include video frames corresponding to the car's position in 5 seconds, could be crowd sourced and clustered. These clusters may be considered action clusters, as they reflect the driver's actions in a given environment. Assuming that the typical driver behavior is a good behavior, the action clusters could be categorized based on the number of elements in each cluster, which would reflect the likelihood that a driver in a particular environment took a certain action. The action clusters with more elements or weight/mass may be deemed safer actions.

According to certain aspects of the present disclosure, crowd sourced driver statistics may be used to determine safe and typical behaviors. In one embodiment, driver behavior may be assessed based on these determined safe and typical behaviors. For example, the driver behavior distributions may be determined for different maneuvers and events. Statistical analysis or machine learning methods may be used based on the determined driver behavior distributions to determine driver grades. For example, the lane position for a driver may be measured across drivers, either in general or based on scene recognition determined similar contexts, such as United States freeways. The distribution of the lane positions may then be formed with the mean and standard deviation computed, and the driver grade may be a function of the standard deviation and mean or median, such as the number of standard deviations away from the mean. A value closer to the mean may be graded higher while a value farther from the mean would be graded lower. Furthermore, the grade may be scaled by the standard deviation of the distribution of lane positions across drivers in a similar context. Similarly, the distribution of lane changes or freeway merge temporal paths may be computed across drivers. Then the grade may be based on a deviation from typical paths. Alternatively, the paths across drivers may have grades assigned based on how close they come to another vehicle. In these examples, the driver's path may be compared against a dictionary of paths aggregated across multiple drivers and a grade may be assigned based on the typical outcome of drivers with similar paths.

As in the above examples, crowd-sourced data may include descriptors of events or objects detected by a number of devices. For example, a device configured according to certain aspects of the present disclosure may transmit data relating to a car's lane position to a second device. The second device may be a cloud server. The cloud server may also interact with other similarly configured devices from other cars and may thereby receive data regarding lane positions, for example, from a sample of cars on the road. Based on the received data, the second device may create an inference engine. For example, it may train a neural network to detect abnormal lane positions, where a cluster of received lane position data may be used to determine what a normal lane position could be.

Certain aspects of the present disclosure may be directed to systems, devices, and methods of learning action values using Q-learning. Continuing with the above example, an inference engine determined at a second device may learn that some abnormal lane positions are actually characteristic of safe or responsive driving. In this example, the second device may have trained a reinforcement learning model that may output a safe or unsafe action based on visual data, and an inferred action of the driver may be compared to the output of the model. Alternatively, or in addition, the reinforcement learning model may output a description of a visual scene corresponding to a safe action being taken in response to a first description of the visual scene. In some embodiments, the reinforcement learning model may be based on a sequence of previously detected objects that were detected in visual data by a deployed device. A reinforcement learning model may be trained and/or updated based on a human operator agreeing or disagreeing with an output of the model. Likewise, an update may be based on an agreement between the output of the reinforcement learning model and corresponding outputs of an ensemble of similarly trained reinforcement learning models.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method comprising:
   initially receiving, by at least one processor of a computing device, first visual data captured by at least one camera associated with a monitoring vehicle;
   identifying, by the at least one processor, a monitored vehicle from the first visual data;
   receiving, by the at least one processor, second visual data captured by the at least one camera, wherein the second visual data is captured by the at least one camera subsequent to the capture of the first visual data;
   identifying, by the at least one processor, the monitored vehicle from the second visual data based at least in part on a spatial location of the monitored vehicle within the first visual data and the second visual data;
   determining, by the at least one processor, at least one change to an aspect of the monitored vehicle based on a comparison of the first visual data and the second visual data;
   determining, by the at least one processor, an occurrence of an unsafe driving event comprising an unsafe following distance between the monitoring vehicle and the monitored vehicle, wherein the monitoring vehicle is following the monitored vehicle; and
   determining, by the at least one processor, whether the monitoring vehicle or the monitored vehicle caused the occurrence of the unsafe driving event based at least in part on said at least one change.

2. The method of claim 1, further comprising identifying, by the at least one processor, at least one traffic control device from at least one of the first visual data or the second visual data.

3. The method of claim 2, wherein the at least one traffic control device is one or more lane marker.

4. The method of claim 3, further comprising:
determining, by the at least one processor, based at least in part on a spatial location of the one or more lane marker in the first visual data, that the monitored vehicle was in an adjacent lane with respect the monitoring vehicle at a first time; and
determining, by the at least one processor, based at least in part on a spatial location of the one or more lane marker in the second visual data, that the monitored vehicle was in a same lane with respect the monitoring vehicle at a second time.

5. The method of claim 4, wherein the said at least one change is a change of the monitored vehicle from the adjacent lane in the first visual data to the same lane in the second visual data.

6. The method of claim 5, wherein the monitored vehicle is determined to have caused the occurrence of the unsafe driving event.

7. The method of claim 3, further comprising determining, by the at least one processor, based at least in part on a spatial location of the one or more lane marker in the first visual data and the second visual data, that the monitoring vehicle and the monitored vehicle are in a same lane at a first time and a second time.

8. The method of claim 7, wherein the said at least one change is the monitoring vehicle moving to within at least a threshold distance from the monitored vehicle, wherein the threshold distance is based at least on a speed of the monitoring vehicle.

9. The method of claim 1, wherein the first visual data and the second visual data are captured by a plurality of cameras mounted on or in the monitoring vehicle.

10. The method of claim 1, wherein the change or changes to an aspect of the monitored vehicle comprises at least one of:
a change in feature size of the monitored vehicle,
a change in an angle of incidence of the monitored vehicle from the monitoring vehicle, or
a change in dimension or shape of a determined bounding box for the monitored vehicle.

11. The method of claim 1, wherein the occurrence of the unsafe driving event is further determined based on at least one of speed data, accelerometer data, gyrometer data, inertial sensor data, atmospheric sensor data, on-board diagnostic (OBD-II) data, or global positioning system (GPS) data.

12. The method of claim 8, wherein the monitoring vehicle is determined to have caused the occurrence of the unsafe driving event.

13. The method of claim 1, further comprising determining, by the at least one processor, a driver grade based at least in part on the determination of the cause of the occurrence of the unsafe driving event.

14. The method of claim 1, further comprising transmitting, by the at least one processor, first data to a second computing device based at least in part on the determination of the cause of the occurrence of the unsafe driving event.

15. The method of claim 14, further comprising determining, by at least one processor of the second computing device, a driver grade based at least in part on the first data.

16. An apparatus comprising:
a memory;
at least one processor operatively coupled to the memory; and
a first set of instructions stored on the memory and configured to be executed by the at least one processor to cause the at least one processor to:
initially receive first visual data captured by at least one camera associated with a monitoring vehicle;
identify a monitored vehicle from the first visual data;
receive second visual data captured by the at least one camera, wherein the second visual data is captured by the at least one camera subsequent to the capture of the first visual data;
identify the monitored vehicle from the second visual data based at least in part on a spatial location of the monitored vehicle within the first visual data and the second visual data;
determine at least one change to an aspect of the monitored vehicle based on a comparison of the first visual data and the second visual data;
determine an occurrence of an unsafe driving event comprising an unsafe following distance between the monitoring vehicle and the monitored vehicle, wherein the monitoring vehicle is following the monitored vehicle; and
determine whether the monitoring vehicle or the monitored vehicle caused the occurrence of the unsafe driving event based at least in part on said at least one change.

17. The apparatus of claim 16, wherein identification of the monitored vehicle from the visual data further comprises that the at least one processor is configured to:
determine a presence of the monitored vehicle from the first visual data; and
produce one or more first bounding boxes for the monitored vehicle that is determined to be present.

18. The apparatus of claim 17, wherein the at least one processor is further configured to:
analyze the second visual data from the at least one camera based on the one or more first bounding boxes for the monitored vehicle; and
determine one or more second bounding boxes for the monitored vehicle based on the second visual data.

19. The apparatus of claim 18, wherein the change or changes to the aspect of the monitored vehicle is determined based on a comparison of the one or more first bounding boxes to the one or more second bounding boxes for the monitored vehicle.

20. The apparatus of claim 16, wherein the at least one processor is further configured to determine, based on the change or changes to the aspect, a difference in speed between the monitoring vehicle and the monitored vehicle.

21. The apparatus of claim 20, wherein the at least one processor is further configured to determine that the monitoring vehicle or the monitored vehicle is traveling at a speed that is different from surrounding traffic by at least a predetermined threshold, and wherein the occurrence of the unsafe driving event is determined at least in part based on the difference in speed between the monitoring vehicle and the monitored vehicle.

22. A non-transitory computer readable medium having instructions stored thereon that, upon execution by a computing device, cause the computing device to perform operations, wherein the instructions comprise:
instructions to initially receive first visual data captured by at least one camera associated with a monitoring vehicle;
instructions to identify a monitored vehicle from the first visual data;

instructions to receive second visual data captured by the at least one camera, wherein the second visual data is captured by the at least one camera subsequent to the capture of the first visual data;

instructions to identify the monitored vehicle from the second visual data based at least in part on a spatial location of the monitored vehicle within the first visual data and the second visual data;

instructions to determine at least one change to an aspect of the monitored vehicle based on a comparison of the first visual data and the second visual data;

instructions to determine an occurrence of an unsafe driving event comprising an unsafe following distance between the monitoring vehicle and the monitored vehicle, wherein the monitoring vehicle is following the monitored vehicle; and instructions to determine whether the monitoring vehicle or the monitored vehicle caused the occurrence of the unsafe driving event based at least in part on said at least one change.

23. The non-transitory computer readable medium of claim 22, wherein the instructions further comprise:

instructions to crop the first visual data such that the monitored vehicle identified from the first visual data remains;

instructions to crop the second visual data such that the monitored vehicle identified from the second visual data remains; and instructions to determine the change or changes to the aspect based on a comparison of the cropped visual data and the cropped second visual data.

24. The non-transitory computer readable medium of claim 23, wherein the instructions further comprise instructions to down sample the first visual data and the second visual data before or after the first visual data and the second visual data are cropped.

25. The non-transitory computer readable medium of claim 22, wherein the instructions further comprise:

instructions to capture a plurality of visual data frames from which the monitored vehicle are identified;

instructions to determine a confidence level for object detection of each of the plurality of visual data frames;

instructions to select a first visual data frame as the first visual data based on the confidence level of the first visual data frame; and instructions to select a second visual data frame as the second visual data based on the confidence level of the second visual data frame.

26. The method of claim 1, wherein the determination whether the monitoring vehicle or the monitored vehicle has caused the occurrence of the unsafe driving event occurs prior to an accident occurring.

* * * * *